US005176074A

United States Patent [19]

Hartmann

[11] Patent Number: 5,176,074

[45] Date of Patent: Jan. 5, 1993

[54] MEMBRANE OF A PRESS FOR THE SEPARATION OF LIQUID AND SOLID MATERIALS

[75] Inventor: Eduard Hartmann, Schneisingen, Switzerland

[73] Assignee: Bucher-Guyer AG Maschinenfabrik, Niederweningen, Switzerland

[21] Appl. No.: 714,615

[22] Filed: Jun. 13, 1991

[30] Foreign Application Priority Data

Jun. 15, 1990 [CH] Switzerland .......................... 2013/90

[51] Int. Cl.[5] .......................... B30B 5/02; B32B 5/08; B32B 5/12; B32B 5/26

[52] U.S. Cl. .......................... 100/116; 428/110; 428/113; 428/114

[58] Field of Search ................ 100/116; 428/113, 110, 428/114

[56] References Cited

U.S. PATENT DOCUMENTS

| | | | |
|---|---|---|---|
| 4,438,690 | 3/1984 | Allworden | 100/116 |
| 4,607,570 | 8/1986 | Hauser | 100/116 |
| 4,857,379 | 8/1989 | Plontges et al. | 428/113 |
| 5,001,003 | 3/1991 | Mahr | 428/113 |

*Primary Examiner*—James C. Cannon
*Attorney, Agent, or Firm*—Edmund M. Jaskiewicz

[57] ABSTRACT

The presses used in extracting the juice from fruits, grains, berries and vegetables have a membrane actuable by a fluid pressure medium. The membrane is made of a woven fabric coated on both sides with plastic, and comprises a multi-axial fiber composite structure of several fiber systems. At least two fiber systems have fibers at right angles to each other and an additional plurality of fiber systems have fibers oblique with respect to the fibers at right angles to each other.

7 Claims, 1 Drawing Sheet

MEMBRANE OF A PRESS FOR THE SEPARATION OF LIQUID AND SOLID MATERIALS

Figure 2:
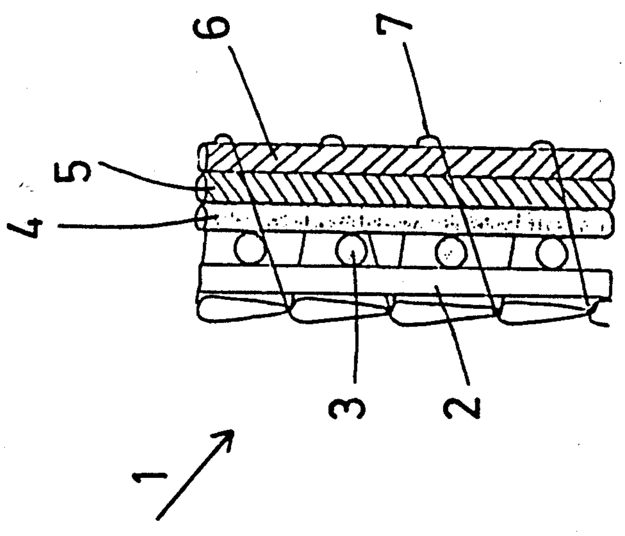

The present invention relates to a membrane for the interior of a pressure chamber in a press for the separation of liquid and solid materials and dividing the pressure chamber into a pressure space and a pressing space wherein the membrane is actuated by a fluid pressure medium, more particularly, to the fiber structure of such a membrane.

Such membranes are known, i.e., in pneumatic presses for extracting juice from agricultural products, in particular fruits, grains, berries and vegetables. Of course, they are also suitable for the pressing out of other products or goods containing liquid.

In this case, the pressure exerted on the goods to be pressed out is produced by a membrane fed from the pressure space side of the pressure vessel by air pressure, water pressure or a similarly effective fluid pressure medium, which, for example, extracts the juice from the concentrated mash in the pressing space of the pressure vessel equipped with a drainage device.

In this process, performed repeatedly in several stages, with subsequent return or withdrawal phase, in which the membrane is withdrawn, great tensile and shearing forces occur on the membrane.

In order to absorb these forces and to maintain gas-tightness of the membrane, the membrane is produced from a plastic-coated fabric made of fibers or filaments. Two thread or fiber systems forming warp and weft are linked with one another for this purpose by so-called high-and-deep movements. The fiber systems are wound around the crossing points or intersections of the fibers to the binding points, on which the fibers or threads are not straight but bent at right angles.

This right angle or orthogonal bending is responsible for the so-called structural extension. In the case of a tensile stress, the orthogonal bending is almost straightened out. The dimensional stability thus is sufficient in warp and weft direction, but insufficient in the diagonal direction.

As a result of this situation, the problem of insufficient service life of a membrane occurs since the membrane is also stressed in directions deviating from warp and weft. Bubble-type hollow spaces are produced between the coatings which separate from the fabric by the shearing forces having an effect on the membrane in a direction other than from the warp and weft. These hollow spaces expand little by little in a flat way and then break off from the membrane to damage the membrane. In this condition, a membrane is completely unusable, since it is no longer able to meet the functional demands placed on it.

It is therefore the principal object of the present invention to provide a novel and improved membrane for a press for the separation of liquid and solvent materials.

It is another object of the present invention to provide such a membrane whose operating life can be significantly increased and wear on the membrane can be noticeably decreased as a result of its fiber structure.

According to the invention this object is achieved in that the membrane is provided with a multi-axial fiber composite structure formed from several thread or fiber systems.

The objects of the present invention are achieved and the disadvantages of the prior art are overcome by providing a membrane for the interior of a pressure chamber in a press for the separation of liquid and solid materials and dividing the pressure chamber into a pressure space and a pressing space wherein the membrane is actuated by a fluid pressure medium. The membrane comprises a composite fiber structure coated with plastic on at least one side thereof and having a plurality of linked fiber systems disposed with respect to each other to define a multi-axial composite fiber structure.

As a result of this embodiment, it is possible to stress a membrane of the initially-mentioned type in all directions of its extension by traction. It is especially advantageous if the fiber systems mutually form approximately the same angles.

It is advantageous to provide a modification, in which the fiber composite is formed from two fiber systems each enclosing right-angled areas and fiber systems running obliquely, so that a tensile stress of the membrane is feasible in various directions.

Since the extensibility of a membrane is the greatest in the diagonal direction formed by the fiber systems running orthogonally, it is preferable to align the fiber system running obliquely approximately parallel to the diagonal direction of the fiber systems forming rectangles or squares. This structure has an especially favorable effect if the fiber systems running obliquely are placed so that their fibers form the diagonals of the rectangles or squares of the fiber systems running orthogonally to one another.

For simple linking of the fiber systems, the binding points resulting through the fiber systems running obliquely are attached to the fiber sections being extended between the binding points of the fiber systems running orthogonally. The stability of the fabric is thus improved considerably.

Figure 1:
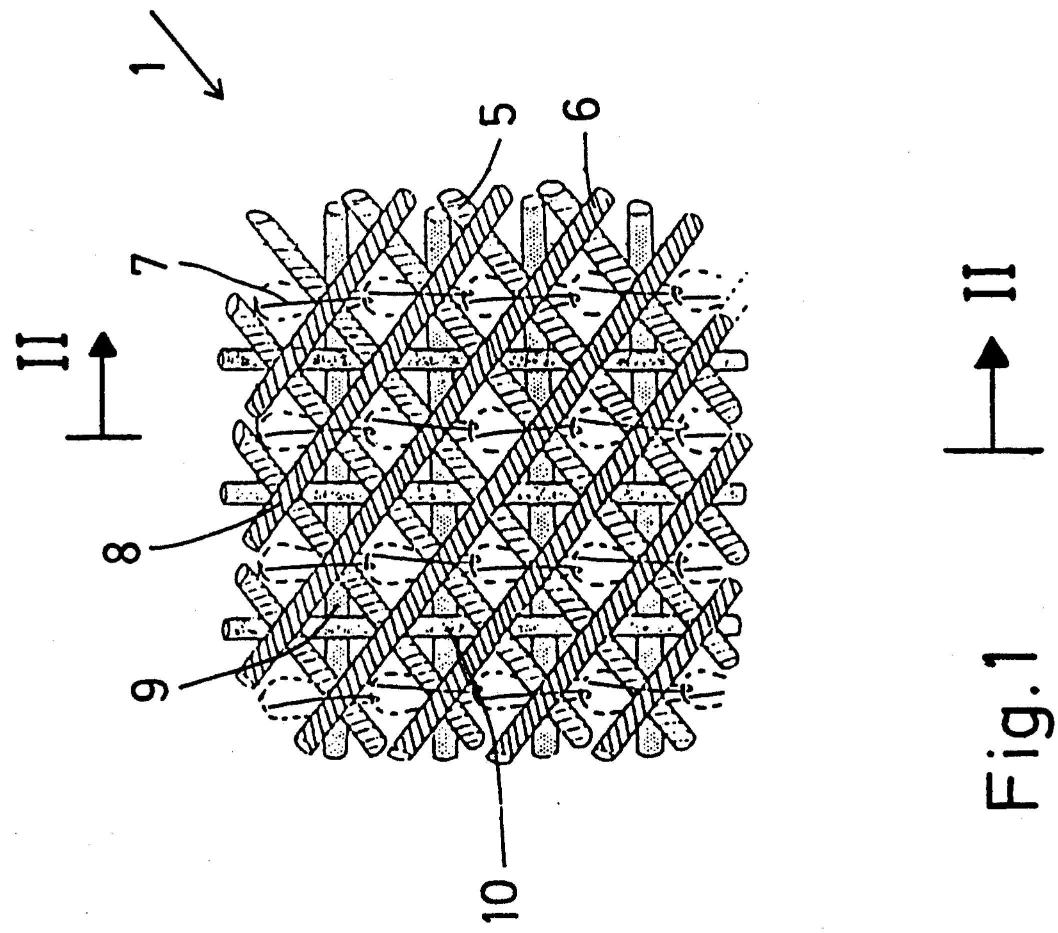

Other objects and advantages of the present invention will be apparent upon reference to the accompanying description when taken in conjunction with the following drawings, which are exemplary, wherein;

FIG. 1 is a top view of a fiber composite structure with multi-axial fiber systems placed over one another and FIG. 2 is a sectional view through the thread composite along the line II/II in FIG. 1.

Proceeding next to the drawings wherein like reference symbols indicate the same parts throughout the various views a specific embodiment and modifications of the present invention will be described in detail.

A multilayer woven fabric 1 made of several fiber systems 2 to 6 is shown in FIGS. 1 and 2. Each fiber system respectively consists of threads or fibers placed parallel next to one another, which are mutually linked by thinner threads 7. In the case of this multi-axial fiber composite structure, thread systems 2 to 6 are aligned so that the resulting fabric has approximately the same extensibility in all directions. Therefore, thread systems 2 to 6 are placed in several directions so that no irregular extensions are produced in the case of a tensile stress. This embodiment shows, i.e., that to three thread systems 2 to 4, attached orthogonally to one another, two other thread systems 5, 6 running in different directions, are added, which together form the fabric 1. Thread systems 2 to 4 placed orthogonally enclose rectangular areas. In the direction of their diagonals, these fields exhibit the lowest dimensional stability, and therefore the other thread systems are placed parallel to them. The attachment of bent thread systems 5,6 added to thread systems 2 to 4 running orthogonally occurs by linking binding points 8 of thread systems 5,6 to thread sections 9 which are between binding points 10 of thread systems 2 to 4 running orthogonally.

The production of membranes of a press intended to press liquid and solid materials takes place by a rolling process, in which the woven fabric is guided over a flat table and is coated with viscous compound made from polyurethane, which is rolled into the thread composite on one side.

Experience has shown that in the case of a membrane, which is attached to the pressure vessel of the initially mentioned press approximately along a plane containing a central or mid-point thereof and which has approximately the shape of half the pressure vessel, the membrane surfaces particularly on the front side or pressing side are exposed to a high tensile stress and their fabrics require a considerable reinforcement. Therefore, it is of importance that the membrane surfaces on the front side are provided with a multi-axial thread composite according to the present invention to provide a longer operating life.

It will be understood that this invention is susceptible to modification in order to adapt it to different usages and conditions, and accordingly, it is desired to comprehend such modifications within this invention as may fall within the scope of the appended claims.

What is claimed is:

1. A membrane for the interior of a pressure chamber in a press for the separation of liquid and solid materials and dividing the pressure chamber into a pressure space and a pressing space wherein the membrane is actuated by a fluid pressure medium, comprising a composite fiber structure coated with plastic on at least one side thereof and having a plurality of linked fiber systems disposed with respect to each other to define a multi-axial composite fiber structure.

2. A membrane as claimed in claim 1 wherein said fiber systems mutually form substantially the same angles.

3. A membrane as claimed in claim 1 wherein said composite fiber structure comprises at least two fiber systems in which the fibers are at right angles to each other to define rectangular areas there between and a plurality of fiber systems in which the fibers extend obliquely with respect to said rectangular areas.

4. A membrane as claimed in claim 3 wherein said fiber system having oblique fibers therein has its fibers substantially parallel to the diagonals of said rectangular areas.

5. A membrane as claimed in claim 4 wherein said fiber system having oblique fibers therein has its fibers disposed to define diagonals of said rectangular areas.

6. A membrane as claimed in claim 3 and further comprising linking fibers binding said fiber systems having fibers at right angles and said fiber systems having oblique fibers, said linking fibers attaching the intersections of said oblique fibers to portions of fibers at right angles which are disposed between intersections of said right angle fibers.

7. A membrane as claimed in claim 1 and further comprising a rotatable operable pressure vessel of a press having a central axis, a membrane disposed along a plane containing said axis and substantially dividing the pressure vessel into two substantially equal halves, the front side of said membrane comprising said multi-axial fiber composite structure.

* * * * *